(12) United States Patent
Yang

(10) Patent No.: US 9,605,822 B2
(45) Date of Patent: Mar. 28, 2017

(54) HEAD OF SOLAR STREET LIGHT

(71) Applicant: Shuli Yang, Henan (CN)

(72) Inventor: Shuli Yang, Henan (CN)

(*) Notice: Subject to any disclaimer, the term of this patent is extended or adjusted under 35 U.S.C. 154(b) by 0 days.

(21) Appl. No.: 14/766,993

(22) PCT Filed: Nov. 10, 2014

(86) PCT No.: PCT/CN2014/090676
§ 371 (c)(1),
(2) Date: Aug. 11, 2015

(87) PCT Pub. No.: WO2015/070738
PCT Pub. Date: May 21, 2015

(65) Prior Publication Data
US 2015/0377433 A1 Dec. 31, 2015

(30) Foreign Application Priority Data

Nov. 15, 2013 (CN) .......................... 2013 1 0576989

(51) Int. Cl.
*F21S 9/03* (2006.01)
*F21V 15/01* (2006.01)
(Continued)

(52) U.S. Cl.
CPC .............. *F21S 9/037* (2013.01); *F21V 7/041* (2013.01); *F21V 15/01* (2013.01); *F21V 19/00* (2013.01);
(Continued)

(58) Field of Classification Search
CPC ..................................................... F21V 29/15
See application file for complete search history.

(56) References Cited

U.S. PATENT DOCUMENTS 6,948,826 B2 * 9/2005 Fogerlie .................. F21S 8/086
126/704
7,057,821 B2 * 6/2006 Zincone ................ E04D 13/033
136/246
(Continued)

FOREIGN PATENT DOCUMENTS

CN 101307873 A 11/2008
CN 101694276 A 4/2010
(Continued)

OTHER PUBLICATIONS

1st Office Action of counterpart Chinese Patent Application No. 201310576989.6 issued on Mar. 26, 2015.
(Continued)

*Primary Examiner* — Jong-Suk (James) Lee
*Assistant Examiner* — Eric T Eide

(57) ABSTRACT

The Invention provides a head of solar street light to solve such problems of the existing solar street lamp as inconvenient installation, easily damaged battery by high temperature and improper work in rainy days, etc. The head of solar street light invention can be used for replacing all AC street lamps. The invention comprises a crystalline silicon panel, a LED light set, a battery, a control system and a lamp housing; a cavity is concavely provided on the back of the lamp housing, which is covered with the crystalline silicon panel that forms an airtight vacuum insulation zone with the cavity; cavities for lamp and battery, which are insulated through the vacuum insulation zone, are concavely provided on the front side of the lamp housing, and the LED light set and the battery are installed in the lamp cavity and the battery cavity respectively.

15 Claims, 2 Drawing Sheets

(51) Int. Cl.
*F21V 19/00* (2006.01)
*F21V 29/15* (2015.01)
*F21V 7/04* (2006.01)
*F21W 131/103* (2006.01)
*F21Y 101/00* (2016.01)

(52) U.S. Cl.
CPC ....... *F21V 29/15* (2015.01); *F21W 2131/103* (2013.01); *F21Y 2101/00* (2013.01); *Y02B 20/72* (2013.01)

(56) References Cited

U.S. PATENT DOCUMENTS

| | | | | |
|---|---|---|---|---|
| 7,329,030 B1* | 2/2008 | Wang | ............ | F21V 29/004 165/104.11 |
| 8,070,311 B2* | 12/2011 | Lu | ............ | F21S 8/088 362/183 |
| 8,186,845 B2* | 5/2012 | Zheng | ............ | F21S 2/00 362/183 |
| 8,475,002 B2* | 7/2013 | Maxik | ............ | F21S 2/00 362/157 |
| 8,599,254 B2* | 12/2013 | Zittel | ............ | H04N 7/183 348/143 |
| 8,714,768 B2* | 5/2014 | Tittle | ............ | H01L 31/0422 362/145 |
| 8,833,985 B2* | 9/2014 | Robertson | ............ | F21L 4/08 362/431 |
| 8,840,335 B2* | 9/2014 | Martin | ............ | G08B 5/36 340/907 |
| 8,853,947 B2* | 10/2014 | Asato | ............ | H05B 33/0884 315/287 |
| 9,046,235 B2* | 6/2015 | Wilson | ............ | F21S 9/035 |
| 9,115,876 B1* | 8/2015 | Mart | ............ | F21V 23/005 |
| 9,163,821 B2* | 10/2015 | Yoon | ............ | F21V 29/004 |
| 2012/0069554 A1* | 3/2012 | Toya | ............ | F21L 4/00 362/158 |

FOREIGN PATENT DOCUMENTS

| | | |
|---|---|---|
| CN | 202719528 U | 2/2013 |
| CN | 202791765 U | 3/2013 |
| CN | 203656783 U | 6/2014 |

OTHER PUBLICATIONS

International Search Report of PCT Patent Application No. PCT/CN2014/090676 issued on Feb. 16, 2015.

* cited by examiner

HEAD OF SOLAR STREET LIGHT

FIELD OF THE INVENTION

The Invention relates to a street lamp, in particular to a head of solar street light.

BACKGROUND OF THE INVENTION

Due to the increasing deterioration of current global environment, various countries are striving to develop the clean energy. With the rapid growth of national economy, the contradiction between energy supply and energy demand in China has become increasingly prominent with acute shortage of electric power supply. Facing the growing electricity demand and gradual scarcity of electric power resources, the application of solar has been developing rapidly.

At present, the solar street lamp has already appeared on the market. The power supply principle of the existing solar street lamp is firstly absorbing solar energy by a crystalline silicon panel and then transforming the solar energy into the electric energy to store in a battery. During absorption of solar energy, the temperature of the crystalline silicon panel will rise rapidly to above 58° C., however, the maximum temperature resistance of storage battery and aluminum battery is just 55° C. The battery will accelerate aging process under high temperature and thus reduce its service life. In order to prevent the battery from being damaged by high temperature, the battery box and the crystalline silicon panel are often installed separately at present and the battery is buried in the ground to avoid being damaged by high temperature. Meanwhile some kinds of the integrated solar street lamp are also available on the market. To avoid the battery being damaged by high temperature, the lamp housing of this kind of street lamp is often designed as a large radiator or added with a large radiator to constantly lower the surface temperature of the battery by heat dissipation of the radiator.

The aforementioned separated type solar street lamp needs a specialized ground buried base for battery and electric wires for connection with the battery, the light source, the crystalline silicon panel and the control system. It is extremely inconvenient for installation and needs a professional technician for on-site installation and debugging. Once it is damaged, a professional technician is again needed for on-site inspection and maintenance. As for the solar street lamp adopting a radiator for heat dissipation, the cost is high and the street lamp is too heavy to move and install. Moreover, the heat dissipation through the radiator causes a great loss of energy.

SUMMARY OF THE INVENTION

The Invention provides a head of solar street light to solve such problems of the existing solar street lamp as inconvenient installation, easily damaged battery by high temperature and improper work in rainy days, etc. The head of solar street light of the Invention can be used for replacing all AC street lamps to realize the dreams of illumination with no electric charge, no pollution, no danger, no wiring, no management, no maintenance and no energy consumption.

The technical scheme of the Invention is realized as follows:

A head of solar street light, the head of solar street light comprising: a crystalline silicon panel, a LED light set, a battery, a control system and a lamp housing; wherein a cavity is concavely provided on the back of the lamp housing which is covered with the crystalline silicon panel, and the crystalline silicon panel is hermetically connected to the lamp housing and forms an airtight vacuum insulation zone with the cavity; a lamp cavity and a battery cavity, which are insulated through the vacuum insulation zone, are concavely provided on the front side of the lamp housing, and the LED light set and the battery are installed in the lamp cavity and the battery cavity respectively; the control system is installed in the lamp housing and electrically connected to the crystalline silicon panel, the LED light set and the battery respectively.

Further, the crystalline silicon panel is a 6-18V crystalline silicon panel.

Further, the control system comprises a main control system and a backup control system, and a switching circuit for fault detection is installed between the main control system and backup control system.

Further, the crystalline silicon panel is horizontally installed on the back of the lamp housing.

Further, the head of solar street light also comprises a fixed regulating member which consists of a fixed seat and a socket used for connecting light pole. An end of the fixed seat is fixedly connected to the side edge of the lamp housing, and the socket can be rotationally installed on the fixed seat.

Further, a reflection cup, which is enclosed by four side panels and one bottom panel, is installed between the LED light set and the lamp cavity. The side panels and the bottom panel form an inclined angle of 90 to 120 degrees.

Further, the head of solar street light also comprises a reflection plate which is equipped with plural cylindrical lamp tubes. The LED light set is arranged between the reflection plate and the reflection cup, and each LED lamp bead of the LED light set is arranged in the corresponding cylindrical lamp tube.

Further, the lamp housing is a plastic lamp housing and there are tiny bubbles inside the plastic lamp housing.

It can be seen from above description that the Invention possesses the following advantages when compared with the prior art:

1. The Invention provides a cavity on the back of the lamp housing and seals the cavity with the crystalline silicon panel and makes a vacuum insulation zone with the cavity through vacuum-pumping. The vacuum insulation zone isolates the crystalline silicon panel, the LED light set, the battery and the control system with vacuum to avoid conduction of heat from the crystalline silicon panel to such parts as the LED light set, the battery and the control system by the principle that vacuum cannot conduct heat. Meanwhile, the vacuum insulation zone is concavely provided on the front side of the lamp housing and isolates the lamp cavity and the battery cavity with vacuum to prevent the heat generated by the LED light set from being conducted to the battery cavity and causing damages to the battery for overheat.

2. The lamp housing of the Invention is made of plastic containing tiny bubbles which has advantages of light weight, sturdy and durable structure, high temperature resistance and low cost. Due to the countless tiny bubbles in the plastic and uncirculated air inside the bubbles, the air in the bubbles will expand and spill out under high temperature and then form plural air chambers in the plastic in the process of manufacturing bubble-containing plastic. As temperature decreases, the air in the air chambers will return to normal. The extremely scarce amount of the air makes the air chambers almost in vacuum state and due to the uncirculated residual air, the plastic containing tiny bubbles will have extremely low thermal conductivity. The Invention adopts the aforementioned lamp housing made of plastic containing tiny bubbles, making the thermal conductivity of the lamp housing lower, thus preventing the temperature of the lamp housing from rising under the sunlight and conducting heat to the battery and the control system in the lamp housing.

3. The Invention possesses a fixed regulating member which consists of a fixed seat and a socket for connecting light pole. Through which, it can replace all AC street lamp heads on the market conveniently without any professional technicians. The product of the Invention can be plugged in any of the street light poles using the socket without connecting wires after unplugging the AC lamp head. All installation work for the product of the Invention can be accomplished conveniently by tightening the screws of the fixed regulating member and pressing down the water-proof switch.

BRIEF DESCRIPTION OF THE DRAWINGS

In order to illustrate the embodiments of the Invention or the technical scheme of the prior art more clearly, the figures required in the description for the Embodiments or the prior art will be introduced briefly as follows. Obviously, the figures described below are just a part of the embodiments of the Invention. A person skilled in the art can obtain other figures according to these figures without any creative work.

DETAILED DESCRIPTION OF THE PREFERRED EMBODIMENTS

A clear and full description for the technical scheme of the Embodiments of the Invention will be given in combination of the figures of the Embodiments of the Invention as follows. Obviously, the described Embodiments are just a part rather than the whole Embodiments of the Invention. Based on the Embodiments of the Invention, any other embodiments obtained by a person skilled in the art without any creative work shall fall within the protection scope of the invention.

Figure 1:
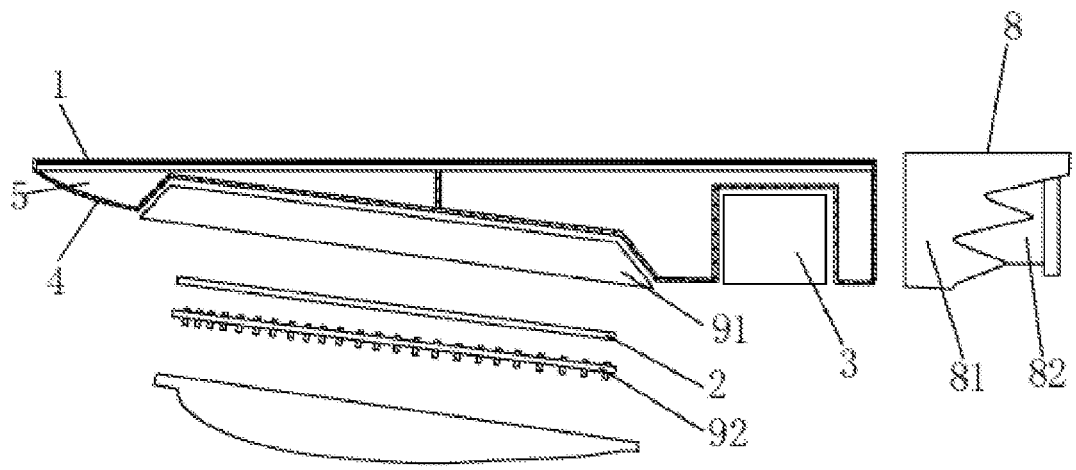
FIG. 1 is a breakdown structural diagram of partial section view of the Invention.
Figure 2:
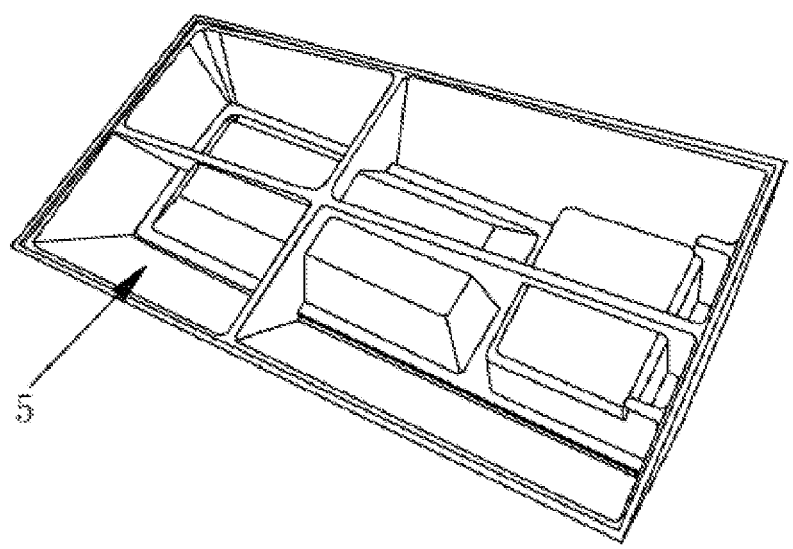
FIG. 2 is a structural diagram of the cavity of the back of the lamp housing of the Invention.
Figure 3:
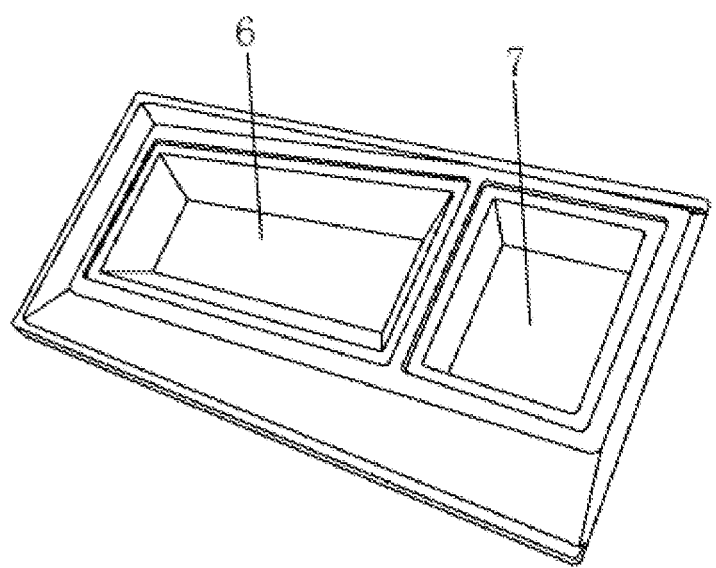
FIG. 3 is a structural diagram of the lamp cavity and the battery cavity of the front side of the Invention.

Refer to FIGS. 1-3, the head of solar street light comprises a crystalline silicon panel 1, a LED light set 2, a battery 3, a control system (not shown in the figures) and a lamp housing 4 made of plastic containing tiny bubbles; a cavity 5 is concavely provided on the back of the lamp housing 4 which is covered with the crystalline silicon panel 1. The crystalline silicon panel 1 is hermetically connected to the lamp housing 4 and forms an airtight vacuum insulation zone with the cavity 5; a lamp cavity 6 and a battery cavity 7, which are insulated through the vacuum insulation zone, are concavely provided on the front side of the lamp housing 4, and the LED light set 2 and the battery 3 are installed in the lamp cavity 6 and the battery cavity 7 respectively; the control system is installed in the lamp housing 4 and electrically connected to the crystalline silicon panel 1, the LED light set 2 and the battery 3 respectively. The head of solar street light of the Invention is an integrated operational body with complete independence. It can be operated independently without the help of any technical forces. The aforementioned head of solar street light can automatically collect the energy from light sources as sunlight to generate and store electricity, and intelligently discharge for illumination.

The existing solar street lamp has a fatal flaw, i.e., it can not work properly in rainy days, and can not utilize only the solar energy supply. And the AC power supply must be utilized as a supplementary. The reason lies in: 1. Each configuration parameter of the solar street lamp and the generated power of the solar panel and the discharge power of the light source are usually calculated based on the voltage and current generated under sunlight, therefore, it can not normally generate electricity to achieve illumination in rainy days; 2. Charging the battery with an 18V solar panel can easily cause circuit fault and make the 18V solar panel charge the battery directly, or provide power supply to the LED light directly, and eventually damage the battery and the LED light set.

In order to solve the aforementioned problems, the crystalline silicon panel 1 adopts a 6-18V crystalline silicon panel, and preferably a 6V crystalline silicon panel; It is well known that the lower the voltage is, the larger the current is at a certain power. The Invention adopts a 6V crystalline silicon panel, and the total power of the head of solar street light is invariable, thus the current is increased, the charging current for the battery by the crystalline silicon panel 1 is increased and the charging time is longer. Moreover, the 6V crystalline silicon panel requires low sunlight intensity and it can supply electricity under the circumstance of lack of sunlight and in rainy days. In addition, the principle of vacuum thermal insulation used in the Invention makes the heat of the crystalline silicon panel not dissipate from the housing but concentrate on the crystalline silicon panel 1, which increases the energy utilization rate of the crystalline silicon panel 1. Combining the above factors, a stable power supply in rainy days is then realized without any other supplementary power supply.

Due to the sealed connection between the crystalline silicon panel 1 and the lamp housing 4, the control system is also sealed. In order to reduce the failure rate and avoid the maintenance problems caused by the damaged control system, the Invention adopts the structure of dual control system, i.e., the control system comprises a main control system and a backup control system, and a switching circuit for fault detection is installed between the main control system and the backup control system. When a fault of the main control system is detected by the switching circuit for fault detection, it will be automatically switched in to the backup control system.

Because the requirement of sunlight intensity is high for the existing crystalline silicon panel, the fixed incline angle of the crystalline silicon panel is designed according to the calculation of sunshine duration. The fixed incline angle of the crystalline silicon panel is regulated by adjusting the crystalline silicon panel toward the east or the west according to the different sunshine durations of four seasons and the longitude and latitude. It not only has some troubles in installation, but also needs seasonal adjustment, otherwise the solar street light which works properly in summer is then unable to work properly in winter. After research, it is found that the highest sunlight intensity is from 10:00 a.m. to 3:00 p.m. in each day. If the crystalline silicon panel is installed horizontally, the solar during the daytime of any seasons can be exposed to the crystalline silicon panel. In addition to the power supply in low-light conditions of the Invention, the crystalline silicon panel 1 of the Invention is then preferably horizontally installed on the back of the lamp housing 4.

In favor of convenient installation, the Invention also comprises a fixed regulating member 8 which consists of a fixed seat 81 and a socket 82 used for connecting light pole. An end of the fixed seat 81 is fixedly connected to the side edge of the lamp housing 4 and the socket 82 can be rotationally installed on the fixed seat 81. The installation work for the user can be accomplished easily by plugging the light pole in the socket 82 of the fixed regulating member and tightening with the screws.

Further, a reflection cup 91, which is enclosed by four side panels and one bottom panel, is installed between the LED light set 2 and the lamp cavity 6. The side panels and the bottom panel form an inclined angle of 90 to 120 degrees which can be adjusted within the aforementioned range at will. The illuminating angle can be enlarged to above 130 degree using the reflection cup 91 to realize the illumination for a larger area. According to specific illumination requirements, for some areas demanding concentrated illumination, the Invention also designs a reflection plate 92 which is equipped with plural cylindrical lamp tubes. The LED light set 2 is arranged between the reflection plate 92 and the reflection cup 91, and each LED lamp bead of the LED light set 2 is arranged in the corresponding cylindrical lamp tube. The cylindrical lamp tube can turn the light given out by the LED light set 2 into linear illumination.

The above mentioned are only preferred embodiments of the Invention and do not to limit the Invention. Any amendment, equivalent replacement and improvement made within the range of the spirits and rules of the Invention shall fall within the protection scope of the Invention.

What is claimed is:

1. A head of solar street light, comprising: a crystalline silicon panel, a LED light set, a battery, a control system and a lamp housing; wherein a cavity is concavely provided on the back of the lamp housing which is covered with the crystalline silicon panel, and the crystalline silicon panel is hermetically connected to the lamp housing and forms an airtight vacuum insulation zone with the cavity; a lamp cavity and a battery cavity, which are insulated through the vacuum insulation zone, are concavely provided on the front side of the lamp housing, and the LED light set and the battery are installed in the lamp cavity and the battery cavity respectively; the control system is installed in the lamp housing and electrically connected to the crystalline silicon panel, the LED light set and the battery respectively.

2. The head of solar street light according to claim 1, wherein the crystalline silicon panel is a 6-18V crystalline silicon panel.

3. The head of solar street light according to claim 1, wherein the control system comprises a main control system and a backup control system, and a switching circuit for fault detection is installed between the main control system and the backup control system.

4. The head of solar street light according to claim 1, wherein the crystalline silicon panel is horizontally installed on the back of the lamp housing.

5. The head of solar street light according to claim 1, further comprising a fixed regulating member which consists of a fixed seat and a socket for connecting light pole, wherein an end of the fixed seat is fixedly connected to the side edge of the lamp housing and the socket is rotationally installed on the fixed seat.

6. The head of solar street light according to claim 1, further comprising a reflection cup, defined by four side panels and one bottom panel, and further installed between the LED light set and the lamp cavity, wherein the side panels and the bottom panel form an included angle of 90 to 120 degrees.

7. The head of solar street light according to claim 6, further comprising a reflection plate including plural cylindrical lamp tubes, wherein the LED light set is arranged between the reflection plate and the reflection cup, and each LED lamp bead of the LED light set is arranged in the corresponding cylindrical lamp tube.

8. The head of solar street light according to claim 2, wherein the crystalline silicon panel is horizontally installed on the back of the lamp housing.

9. The head of solar street light according to claim 3, wherein the crystalline silicon panel is horizontally installed on the back of the lamp housing.

10. The head of solar street light according to claim 2, further comprising a fixed regulating member which consists of a fixed seat and a socket for connecting light pole, wherein an end of the fixed seat is fixedly connected to the side edge of the lamp housing and the socket is rotationally installed on the fixed seat.

11. The head of solar street light according to claim 3, further comprising a fixed regulating member which consists of a fixed seat and a socket for connecting light pole, wherein an end of the fixed seat is fixedly connected to the side edge of the lamp housing and the socket is rotationally installed on the fixed seat.

12. The head of solar street light according to claim 2, further comprising a reflection cup, defined by four side panels and one bottom panel, and further installed between the LED light set and the lamp cavity, wherein the side panels and the bottom panel form an included angle of 90 to 120 degrees.

13. The head of solar street light according to claim 3, further comprising a reflection cup, defined by four side panels and one bottom panel, and further installed between the LED light set and the lamp cavity, wherein the side panels and the bottom panel form an included angle of 90 to 120 degrees.

14. The head of solar street light according to claim 12, further comprises further comprising a reflection plate including plural cylindrical lamp tubes, wherein the LED light set is arranged between the reflection plate and the reflection cup, and each LED lamp bead of the LED light set is arranged in the corresponding cylindrical lamp tube.

15. The head of solar street light according to claim 13, further comprising a reflection plate including plural cylindrical lamp tubes, wherein the LED light set is arranged between the reflection plate and the reflection cup, and each LED lamp bead of the LED light set is arranged in the corresponding cylindrical lamp tube.

* * * * *